US007745363B2

(12) United States Patent
Beall et al.

(10) Patent No.: US 7,745,363 B2
(45) Date of Patent: Jun. 29, 2010

(54) GEOPOLYMER COMPOSITES AND STRUCTURES FORMED THEREFROM

(75) Inventors: George Halsey Beall, Big Flats, NY (US); Linda Ruth Pinckney, Corning, NY (US); Patrick David Tepesch, Corning, NY (US); Steven Alvin Tietje, Lindley, NY (US)

(73) Assignee: Corning Incorporated, Corning, NY (US)

( * ) Notice: Subject to any disclaimer, the term of this patent is extended or adjusted under 35 U.S.C. 154(b) by 646 days.

(21) Appl. No.: 11/126,083

(22) Filed: May 9, 2005

(65) Prior Publication Data

US 2006/0251909 A1    Nov. 9, 2006

(51) Int. Cl.
| C04B 35/00 | (2006.01) |
| C04B 12/04 | (2006.01) |
| C04B 7/00  | (2006.01) |
| C04B 16/00 | (2006.01) |
| C04B 24/00 | (2006.01) |
| C04B 24/12 | (2006.01) |
| C09D 1/00  | (2006.01) |

(52) U.S. Cl. .................. 501/98.3; 106/286.2; 106/600; 106/803

(58) Field of Classification Search .............. 106/286.2, 106/803, 600; 501/98.3
See application file for complete search history.

(56) References Cited

U.S. PATENT DOCUMENTS

| 4,349,386 | A | * | 9/1982 | Davidovits ................ 106/813 |
| 4,472,199 | A | * | 9/1984 | Davidovits ................ 106/813 |
| 4,528,275 | A | * | 7/1985 | Hodge ......................... 501/9 |
| 4,631,267 | A | * | 12/1986 | Lachman et al. ............ 502/439 |
| 4,814,300 | A | * | 3/1989 | Helferich .................... 501/84 |
| 5,036,030 | A | * | 7/1991 | Taga et al. .................. 501/125 |
| 5,244,726 | A |   | 9/1993 | Laney et al. ............... 428/312.6 |
| 5,342,595 | A |   | 8/1994 | Davidovits et al. ......... 423/328.1 |
| 5,352,427 | A | * | 10/1994 | Davidovits et al. ......... 423/328.1 |
| 5,532,196 | A |   | 7/1996 | L'Hernault et al. .......... 501/128 |
| 5,610,116 | A | * | 3/1997 | Werdecker et al. ........... 502/232 |
| 6,066,189 | A |   | 5/2000 | Meyer et al. ................. 51/298 |
| 6,464,744 | B2 | * | 10/2002 | Cutler et al. ................. 55/482 |
| 6,864,198 | B2 |   | 3/2005 | Merkel ........................ 501/80 |
| 2002/0010073 | A1 |   | 1/2002 | Beall et al. ................. 501/128 |

FOREIGN PATENT DOCUMENTS

NZ       527772      *   3/2005

WO       2005/019130      3/2005

OTHER PUBLICATIONS

Barbosa. Thermal behaviour of inorganic geopolymers and composties derived from sodium polysialate. Materials Research Bulletin 38. 2003, 319-331.*
Mah. Advanced Rapid Mirror Assembly Processing. 46th AIAA Structures, Structural Dynamics & Materials Conference. Apr. 18-21, 2005. Austin Texas. AIAA 2005-2361.*
V.F.F. Barbosa and K.J.D. MacKenzie, *Synthesis and thermal behaviour of potassium sialate geopolymers*. Mater. Lett. 57, 1477-1482 (2003).
V.F.F. Barbosa and K.J.D. MacKenzie, *Thermal behavior of inorganic geopolymers and composites derived from sodium polysialate*, Mater. Res. Bull. 38, 319-331 (2003).
M.Y. Khalil and E. Merz, *Immobilization of intermediate-level wastes in geopolymers*, J. Nucl. Mater. 211, 141-148 (1994), M.Y. Khalil and E. Merz, *Immobilization of intermediate-level wastes in geopolymers*, J. Nucl. Mater. 211, 141-148 (1994), Abstract only.
J.G.S. van Jaarsveld, J.S.J. van Deventer, and G.C. Lukey, *The characterisation of source materials in fly ash-based geopolymers*, Mater. Lett. 57, 1272-1280 (2003).
K. Ikeda, K. Onikura, Y. Nakamura, and S. Vedanand, *Optical spectra of nickel-bearing silicate gels prepared by the geopolymer technique, with special referecnce to the low-temperature formation of liebenbergite ($Ni_2SiO_4$)*, J. Am. Ceram. Soc. 84, 1717-1720 (2001).
D.L. Evans, G.R. Fischer, J.E. Geiger, and F.W. Martin, *Thermal expansions and chemical modifications of cordierite*, Bull. Am. Ceram. Soc. 63, 629-634 (1980).
Davidovits, J., et al., "Geopolymer Inorganic Resins Their Uses in the Composite Industry,", Composites, Plastiques Renforces Fibres de Verre Textile, Centre Doc. Verre Textile Plas Re. Paris, FR, vol. 31, No. 2, Mar. 1, 1991, pp. 76-89.
Davidovits, J., et al., "Geopolymer: Ultra-High Temperature Tooling Material for the Manufacture of Advanced Composites," International SAMPE Symposium and Exhibition, XX, XX, vol. 36, No. 2, Apr. 15, 1991, pp. 1939-1949.

* cited by examiner

*Primary Examiner*—C. Melissa Koslow
*Assistant Examiner*—Matthew E Hoban
(74) *Attorney, Agent, or Firm*—Matthew B. McNutt

(57) ABSTRACT

Geopolymer composite materials having low coefficient of thermal expansion are disclosed. The materials are useful in high temperature applications due to their low coefficient of thermal expansion and high strength. Also disclosed is a boron modified water glass geopolymer composition that is compatible with ceramic particulate material such as cordierite and fused silica. The geopolymer composite may be extruded to form structures such as honeycomb monoliths, flow filters or used as a plugging or skinning cement and may be fired at temperatures at or below 1100° C. Both the structures and the cement have high green and fired strength, a low coefficient of thermal expansion, and good acid durability. The cost of manufacturing objects using the material of the present invention is substantially reduced, in comparison with typically production methods of cordierite based bodies, due to the substantially shortened firing times.

10 Claims, 1 Drawing Sheet

GEOPOLYMER COMPOSITES AND STRUCTURES FORMED THEREFROM

FIELD OF THE INVENTION

The present invention relates to low coefficient of thermal expansion geopolymer composite materials and articles formed therefrom. The materials of the present invention are useful in the manufacture of high temperature bodies such as diesel particulate filters, catalytic converters, $NO_x$ adsorbers, catalyst substrates, honeycomb monoliths and flow filter bodies for high temperature fluids and in other high temperature applications. Specifically, a composite material of ground low coefficient of thermal expansion (CTE) material particulate such as cordierite, silica, other low CTE materials or a combination thereof with a geopolymer is disclosed. The geopolymer, typically formed by the reaction of activated clay such as metakaolin with alkali silicate aqueous solutions, may be modified by the addition of boric oxide to provide a low CTE material having high green and fired strength and reduced cracking upon firing. The material of the present invention may be extruded and used without prefiring or fired at relatively low temperatures (700°-1100° C.) to provide improved acid resistance and to inhibit cracking during thermal cycling. The material may also be used as a cement for plugging passages of a honeycomb monolith used for a diesel particulate filter and as a coating for the exterior of such a diesel particulate filters.

BACKGROUND OF THE INVENTION

Diesel engines provide lower emissions and increased fuel economy as compared to gasoline engines; however, environmental and health hazards are posed by diesel exhaust emissions. Diesel particulate filters control particulate emissions from diesel-powered equipment such as trucks, buses, diesel electric locomotives and generators. Cordierite is a preferred material for the manufacture of diesel particulate filters and other high temperature bodies such as catalytic converters, $NO_x$ adsorber substrates, catalyst substrates, honeycomb monoliths and flow filter bodies because it is relatively low cost. Cordierite-based composite materials also have a low coefficient of thermal expansion to allow a part to withstand high and variable temperatures.

Diesel particulate filters control diesel particulate emissions by physically trapping soot particles in their structure. Wall flow monoliths such as cordierite filters allow exhaust gasses to flow through the porous ceramic walls, while any particulate is collected on the upstream side of the wall. The filter may be cleaned by auto-regeneration, during which the temperature of the exhaust gas is high enough to ignite any particulate and thereby reduce the backpressure of the diesel particulate filter. The surface of the upstream wall may contain a catalyst wash coat of platinum (Pt), iron (Fe), strontium (Sr) or rare earth elements such as cerium (Ce) to lower the temperature required for auto-regeneration of the filter.

One preferred material for the manufacture of high temperature components is cordierite ($Mg_2Al_4Si_5O_{18}$), a magnesium aluminum silicate that often includes low levels of iron or other impurities. Cordierite ceramics have a low coefficient of thermal expansion (CTE), high strength and are resistant to thermal shock. Cordierite materials are typically manufactured by mixing a raw batch including talc, alumina, aluminum hydroxide, kaolin and silica. The batch is then blended with a binder such as methylcellulose and lubricants such as sodium stearate to form a plastic mixture that is formed into a green body and sintered. U.S. Pat. No. 6,864,198 (hereby incorporated by reference in its entirety), assigned to Corning Incorporated, discloses a method of forming cordierite honeycomb structures. The '198 patent states "[t]he green bodies are dried and then fired at a sufficient temperature and for a sufficient time to form the final product structure. The firing is preferably done by heating to a maximum temperature of about 1405 to 1415° C. over a time period of 50 to 300 hours."

Geopolymers are described in U.S. Pat. Nos. 4,349,386; 4,472,199; and 5,342,595, herein incorporated by reference in their entirety. The geopolymers described are ceramic-like materials with framework structures that can be synthesized at low or ambient temperatures. Geopolymers are typically inorganic materials produced by the polymerization and solidification of mixtures of "active" metakaolin and silica under highly alkaline conditions. The geopolymer materials disclosed in these patents are suggested for products such as building materials and thermal insulation. Geopolymer materials have also been studied for use in bonded abrasive products and for the immobilization of intermediate-level nuclear and toxic wastes.

U.S. Pat. No. 5,244,726, herein incorporated by reference in its entirety, discloses an alkali metal silicate-based matrix that includes inorganic particulates, organic particulates, or a mixture of inorganic and organic particulates which is produced at ambient temperature by activating the silicates of an aqueous, air-entrained gel containing matrix-forming silicate, particulates, fly ash, surfactants, and a pH-lowering and buffering agent. The '726 patent states that particulates should be present in amounts between 30 and 40 volume percent, and particulates such as polystyrene beads for foaming and wollastonite for strengthening the composite material are specifically mentioned.

SUMMARY OF THE INVENTION

The present invention relates to geopolymer composite materials having low coefficient of thermal expansion materials that are suitable for use in a variety of applications such as in high temperature exhaust treatment for internal combustion engines. Specifically, a low-expansion, inorganic composite materials such as cordierite, silica, as well as other low CTE ceramic materials and combinations thereof with a geopolymer are disclosed.

The geopolymer materials of the present invention are preferably chemically modified in order to render the materials compatible with cordierite and/or fused silica as well as other low CTE ceramic materials to allow the materials to be easily fired at temperatures at or below 1100° C. For such applications, a particulate content of between about 50 and 97% by weight is preferred and greater than about 70% by weight is most preferred. The materials of the present invention are extruded to form honeycomb monoliths or may be used as a plugging or skinning cement. The materials of the present invention may also be fabricated using any standard ceramic processing technique to form a variety of structures. The materials may be used without prefiring, with prefiring to about 300° C. or with firing at relatively low temperatures (700° C.-1100° C.) to provide acid resistance and to inhibit cracking during shrinkage. The structures and the cements have high green and fired strengths, low coefficients of thermal expansion, and good acid durability. The cost of manufacturing objects using the materials of the present invention is substantially reduced, in comparison with conventional production methods, due to the substantially shortened firing times.

The geopolymer composite material of the present invention preferably includes cordierite, silica or a cordierite/silica mixture. Other low CTE ceramic materials may be used in the present invention. The ground cordierite and vitreous silica as well as other low CTE ceramic materials used in the present invention may be produced by grinding waste material from other manufacturing processes.

The geopolymer composite materials of the present invention preferably exhibit coefficients of thermal expansion equal to or lower than predicted from an arithmetic average of cordierite and/or fused silica with potassium aluminosilicate glass residual from the geopolymer, thereby making them particularly valuable for applications requiring good thermal shock resistance.

DETAILED DESCRIPTION AND PREFERRED EMBODIMENTS OF THE INVENTION

Figure 1:
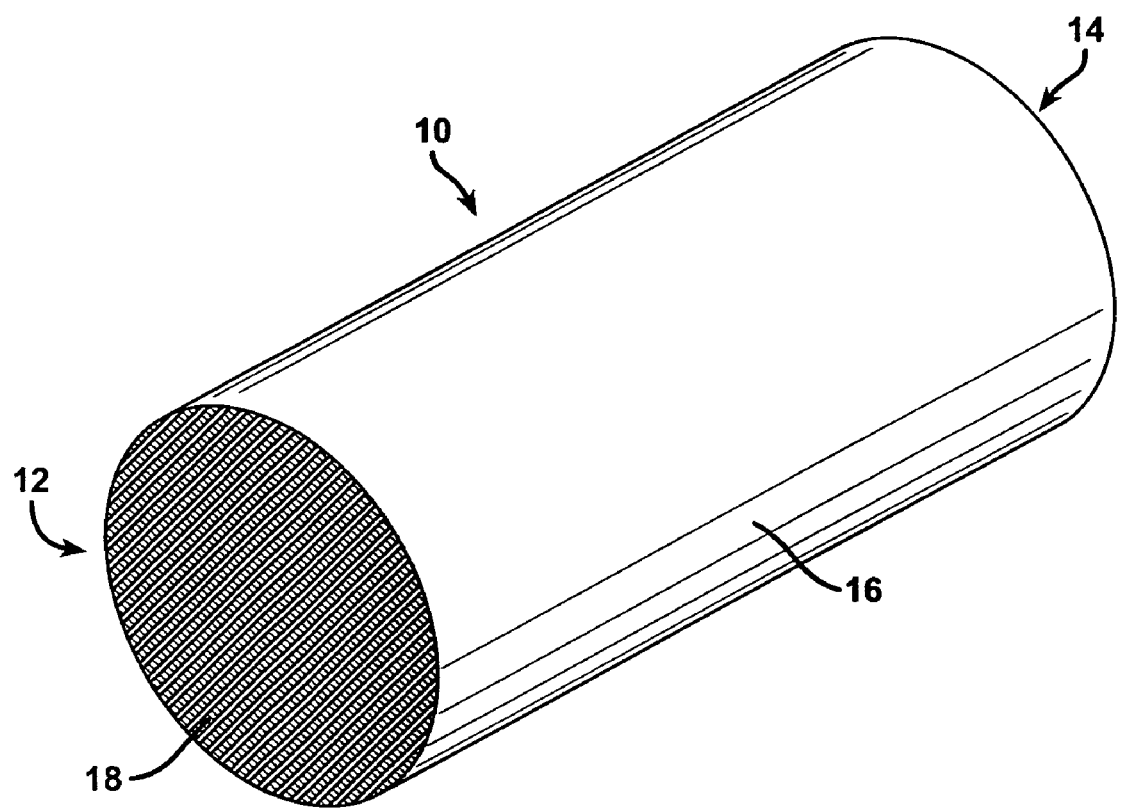
FIG. 1 is a schematic of a flow filter body according to an exemplary embodiment of the present invention.

A flow filter formed of a honeycomb structure 10, according to the present invention, is shown in FIG. 1. The honeycomb structure 10 is composed of a body 16 having an inlet end 12, an outlet end 14, and a plurality of channels 18 extending in parallel and extending between the inlet end 12 and the outlet end 14. An alternating pattern of plugs (not shown) is arranged on inlet end 12 and outlet end 14 so that exhaust flows through the porous walls of the channels 18. The honeycomb structure 10 may be formed of any channel density, typically 200-300 channels per square inch. For the purpose of this application the term honeycomb is intended to include materials having a generally honeycomb structure but is not strictly limited to a hexagonal structure, for example triangular, square, rectangular or any other suitable channel shape may be used.

The structure 10 may be formed of a porous ceramic material and typically has two major phases, a crystalline or vitreous phase resulting from the ceramic particulate material and a glassy phase formed from a geopolymer. Low levels of other silicate or oxide phases, such as spinel ($MgAl_2O_4$) and mullite ($Si_2Al_6O_{13}$), may also be present. Unfired composite materials are preferably cured at 300° C. to prevent subsequent water uptake. More preferably, the composite is fired to temperatures above 800° C. for improved strength, scratch resistance, and durability.

Geopolymers preferred for use in the present invention include poly(silico-oxo-aluminate) or (—Si—O—Al—O—)$_n$ geopolymers, which are based on alumino-silicates. Geopolymerization results from the geosynthesis of poly (silisic) acid ($SiO_2$)$_n$ and potassium alumino-silicate or sodium alumino-silicate in an alkali medium. The reaction of activated kaolin with alkali silicate aqueous solutions is generally used to produce geopolymerization. The sialate (Si—O—Al—O—) serves as the cross-linking or networking element and may be modified in aqueous solution with boric acid ($H_3BO_3$) or boric oxide ($B_2O_3$).

The geopolymer may be any suitable alkali aluminosilicate material demonstrating geosynthesis, chemical stability and controlled shrinkage. Suitable reactants include water glasses such as sodium or potassium silicates and aluminous clays. Kasil-1 a potassium silicate aqueous solution available from PQ Corporation of Berwyn, Pa. (USA), contains approximately 29.1% by weight solids including 8.3% by weight $K_2O$ and 20.8% by weight $SiO_2$ in solution. The solution may be modified by additions of silica in the form of colloidal silica in order to increase the silica content, or by KOH in order to decrease the silica content. One suitable colloidal silica is Ludox available from Grace Davison of Columbia, Md. Boric oxide or boric acid ($HBO_3$) may be added to the solution. Activated aluminum silicate clays such as metakaolin ($Al_2O_3.2SiO_2$) may be added to react with the alkali silicate to initiate the geopolymer formation. Activated aluminum silicate clays also provide alumina and serve to control the (Na+K)/Al atomic ratio. A (Na+K)/Al atomic ratio of approximately 1:1 is suitable. Activated or calcined kaolin such as Glomax LL, available from Dry Branch Kaolin Co. of Dry Branch, Ga. (USA), is one suitable clay. Activated kaolin is typically formed by prefiring hydrous kaolin at approximately 800° C. to drive off structural water without converting the kaolin to mullite.

The activated clay reacts with the hydrated alkali silicate (and with the boric acid or boric oxide when present) at low temperature to produce a modified geopolymer cement that bonds to the particulate filler, even at ambient temperatures.

The particulate filler added to the geopolymer may be any material having a suitable CTE. Preferred materials include ceramic particulate such as ground cordierite, ground vitreous silica, colloidal silica, β-eucryptite ($LiAlSiO_4$), β-spodumene ($LiAlSi_2O_6$) and suitable solid solutions of β-quartz and β-spodumene, or glass ceramics composed predominately of these phases. Any particulate having a suitable CTE, chemical durability and/or resistance to thermal shock may be used.

Cordierite (2MgO.2Al2O3.5SiO2) or cordierite porcelain is a magnesium aluminum silicate produced by fusing a mixture of talc, clay and aluminum oxide. Cordierite and cordierite mineral precursors are also known as magnesium-alumino silicate (2MgO 2Al2O3 5SiO2), indialite, dichroite and iolite. Cordierite has a low coefficient of thermal expansion and high mechanical strength. Cordierite also has excellent thermal shock resistance. A sintered cordierite body will withstand a temperature rise from 70° to 1800° followed by a rapid room-temperature air quench.

Cordierite is commonly fabricated into insulators and substrates due to its good dielectric properties and into flow filter bodies due its low CTE and resistance to thermal shock. Substantial fractions of these products are scrapped during manufacture. This scrap may be ground to any suitable particle size. Reground cordierite from scrap material has a coefficient of thermal expansion of about $14\times10^{-7}$/° C. Ground or particulate vitreous silica is also a desirable addition, because of its low CTE, about 5×10–7/C. A suitable commercial material is Tecosil, available from C-E Minerals of King of Prussia, Pa. (USA).

A particulate is added to the geopolymer to from a composite mixture that is preferably about 50% to 97% by weight particulate and about 3% to 50% by weight geopolymer with additional liquid to provide a wet mix having the desired properties. Other additions may include boron and processing aids such as lubricants, and organic binders (such as methylcellulose). The geopolymer composition, which is amorphous, can vary widely in silica content from approximately $(K, Na)_{(1+x)}Al_{(1-x/3)}SiO_4.mH_2O+pB_2O_3$ to $(K,Na)_{(1+x)}Al_{(1-x/3)}Si_{12}O_{26}.nH_2O+pB_2O_3$, where m and n are variable between 0 to 1000 and dependent upon fabrication technique and firing conditions, and p is (0 to 40) the level of boric oxide desired. The level of water in the geopolymer is variable and dependent upon firing, For example, m and n approach zero where the geopolymer has been fired above about 1000° C., which volatilizes all or nearly all of the water present. In a dilute solution of geopolymer that provides a fluid condition that is desirable for painting a thin layer of geopolymer onto a surface such as the skin of a ceramic honeycomb monolith m and n may be 1000 or higher. The boric oxide level (p) may also vary over a wide range, depending on the desired viscosity of the geopolymer at high temperatures. The addition of $B_2O_3$ reduces the viscosity of the geopolymer matrix or glassy phase to control the degree of sintering, shrinkage and cracking. The upper level of p is limited by the tendency of very high levels of $B_2O_3$ in the geopolymer to reduce chemical resistance.

One method of preparing a wet mix that provides homogeneous mix and ease of handling is set forth below, other conventional methods of forming the wet mix may be used. For example, a preliminary dry mix of ground cordierite, silica or other particulate, activated clay and any binder are mixed for approximately 3 minutes. Colloidal silica and boric oxide or boric acid are added to water and heated until the boric oxide or boric acid is dissolved and homogeneously mixed. The hydrated silica (with optional boric acid) is then added to a prepared water glass solution (such as Kasil potassium silicate solution) to form a liquid mixture. The liquid mixture is then added to the dry mix and mixed to form a wet mix. The activated clay and alkali silicate solution in the wet mix then react to form the geopolymer paste or slurry, the amount of water controls viscosity of the wet mix.

The wet mix may be formed into articles by any known techniques including: doctor-blading, spraying, tape-casting, calendaring, painting or extrusion. The wet mix may also be used for coatings, plugs or skins on cellular ceramic articles, and may be extruded to form honeycomb monoliths. The articles may be dried below 200° C. and subsequently fired between 700° C. and 1200° C. (800°-1000° C. generally being optimal) for greater strength and chemical resistance. Firing to temperatures near 800° C. produces a strong and durable composite with a CTE less than $30 \times 10^{-7}$/C (25°-800° C.). Firing to 1100° C. yields an even higher strength, and firing to 1200° C. is possible without melting and with controlled shrinkage.

Although representative compositions for forming a geopolymer composite material are disclosed, any number of hydrated alkali silicates (with various ratios of $Al_2O_3/SiO_2$ or $(Na_2O+K_2O)/SiO_2$) as well as different ratios of these geopolymer formulations to cordierite and/or fused silica may be used with varying levels of boric oxide or boric acid addition. While cordierite is $Mg_2Al_4Si_5O_{18}$, other solid solutions having the cordierite structure may also be used. Low expansion particulates are not limited cordierite or fused silica, although as recycled materials these are inexpensive, other particulates such as particles of β-eucryptite ($LiAlSiO_4$), β-spodumene ($LiAlSi_2O_6$) and glass-ceramics such as β-quartz s.s. and β-spodumene s.s. may also be used.

Having generally described this invention, a further understanding can be obtained by reference to certain specific examples illustrated below which are provided for purposes of illustration only and are not intended to be all inclusive or limiting unless otherwise specified.

EXAMPLES

Table 1 shows a variety of batch composition mixtures that were found to be suitable for use in the present invention (the 100% geopolymer and 100% cordierite compositions are included for reference). Each of these batch mixtures were prepared as discussed above. The geopolymer type column shows the ratio of $K_2O:Al_2O_3:SiO_2$, for example 1-1-12 is typically $KAlSi_6O_{14}$ and 1-1-6 is typically $KAlSi_3O_8$. The geopolymer weight percent is calculated from the total of the components contributing to the geopolymer, which is Kasil+Glomax LL+Ludox, and thus contains some water.

TABLE 1

| | Batch Materials (In wt. % Dry Batch) | | | |
|---|---|---|---|---|
| | Particulate (wt. %) | | Geopolymer | Geopolymer |
| Composition | Cordierite | Silica | (Wt. %) | Type |
| Geopolymer | 0 | 0 | 100 | 1-1-6 |
| 1 | 50 | 0 | 50 | 1-1-6 |
| 2 | 75 | 0 | 25 | 1-1-6 |
| 3 | 75 | 0 | 25 | 1-1-8 |
| 4 | 90 | 0 | 10 | 1-1-6 |
| 5 | 90 | 0 | 10 | 1-1-12 |
| 6 | 96 | 0 | 4 | 1-1-6 |
| 7 | 67.5 | 22.5 | 10 | 1-1-12 |
| 8 | 45 | 45 | 10 | 1-1-12 |
| 9 | 10 | 80 | 10 | 1-1-12 |
| 10 | 0 | 90 | 10 | 1-1-12 |
| 11 | 100 | 0 | 0 | none |

Example 1

Composition 4, 90 wt. % cordierite 10 wt. % potassium aluminosilicate geopolymer bonded ceramic, modified by an addition of 5 wt. % $B_2O_3$ (of the total batch) was prepared as follows: 2.07 g Glomax LL 186.4 g cordierite and 1 g CMC (AqualonR Cellulose Gum) binder were mixed for 3 minutes; 8.27 g Ludox and 10.36 g boric oxide ($B_2O_3$) were added to 100 g water and heated until the boric oxide dissolves and added to the dry mix and was added; 10.34 g of Kasil-1 was added to the mixed batch and completely mixed to formed a solution. The solution was then added to the dry batch and fully mixed to form a geopolymer bonded wet mix. The batch yielded a dry composition of approximately 94.7% cordierite and 5.3% potassium boroaluminosilicate glass on drying and firing to 800° C. (assuming no dissolution of cordierite). The CTE of Example 1 was about $17.5 \times 10^{-7}$/° C. (25° to 800° C.).

Example 2

Composition 10, 90 wt. % vitreous silica and 10 wt. % potassium aluminosilicate geopolymer-bonded ceramic, modified by a $B_2O_3$ addition of 3 excess wt. % was prepared as follows: 559.2 g crushed vitreous silica, 31 g of Kasil-1, 6.28 g Glomax LL, 24.8 g Ludox and 18.66 g boric oxide were prepared, mixed and fired as described in Example 1. The batch yields a dry composition of approximately 92.8 wt. % silica and 7.2 wt. % potassium boroaluminosilicate glass on drying and firing to 800° C., assuming no dissolution of the silica particulate on firing. The CTE of Example 2 was about $11 \times 10^{-7}$/° C. (25° to 800° C.).

Example 3

Composition 9, 80 wt. % vitreous silica, 10 wt. % cordierite and 10 wt. % potassium aluminosilicate geopolymer-bonded ceramic, modified by a $B_2O_3$ addition of 3 excess wt. % was prepared as follows: 31 g of Kasil-1, 6.28 g Glomax LL, 24.8 g Ludox, 18.66 g boric oxide, 503.24 g fused silica, and 55.92 g ground cordierite are prepared, mixed and fired as described in Example 1. The batch yields a dry composition of approximately 83.6 wt. % silica, 9.2 wt. % cordierite (assuming no dissolution of cordierite) and 7.2 wt. % potassium boroaluminosilicate geopolymer glass on drying and firing to 800° C.

assuming no dissolution of silica or cordierite particulate. The CTE of Example 3 was about $10.0 \times 10^{-7}/°$ C. ($25°$ to $800°$ C.).

Example 4

Composition 7, 67.5 wt. % cordierite, 22.5 wt. % vitreous silica, 10 wt. % potassium aluminosilicate geopolymer-bonded ceramic, modified by a 3 wt. % addition of $B_2O_3$ was prepared as follows: 31 g of Kasil 1, 6.28 g Glomax LL, 24.8 g Ludox 18.66 g boric oxide, 419.36 g ground cordierite and 139.8 g of ground Tecosil vitreous silica were prepared, mixed and fired as described in Example 1. Example 4 yields a dry composition of approximately 69.3 wt. % cordierite, 23.1 wt. % silica and 7.3 wt. % boroaluminosilicate geopolymer glass on drying and firing, assuming no dissolution of either the cordierite or silica particulate on firing. The CTE of Example 4 was about $14.5 \times 10 - 7/C$ (RT-800C).

Example 5

Composition 6, 96 wt. % cordierite, 4 wt. % potassium aluminosilicate (1-1-6) geopolymer-bonded ceramic was prepared as follows: 26.7 g of Kasil 6, 8.26 g Glomax LL, 1.6 g Cabosil, and 877.44 g ground cordierite were prepared, mixed and fired as described in Example 1. Example 5 yields a dry composition of approximately 97.8 wt. % cordierite and 2.2 wt % aluminosilicate glass on drying and firing, assuming no dissolution of cordierite on firing.

Example 6

Composition 1, 50 wt. % cordierite, 50 wt. % potassium aluminosilicate (1-1-6) geopolymer-bonded ceramic was prepared as follows: 106.8 g of Kasil 6, 33.04 g Glomax LL, 6.4 g Cabosil, and 146.24 g ground cordierite were prepared, mixed and fired as described in Example 1. Example 6 yields a dry composition of approximately 64.6 wt. % cordierite and 35.4 wt % aluminosilicate glass on drying and firing, assuming no dissolution of cordierite on firing. The CTE of Example 6 was about $28.9 \times 10 - 7/C$ (RT-800C).

Physical properties including the CTE (heating at $800°$ C.), porosity, pore size, modulus of rupture (MOR) and shrinkage of pressed, dried and fired composites of the materials of the cordierite-based examples of Table 1 are set forth in Table 2 below. The firing temperature and time are shown as ° C.-Hours. Properties which were not measured are shown as nm.

TABLE 2

Cordierite Based Composites: Physical Properties

| Composition (Example #) | Firing (° C.-Hrs) | CTE ($\times 10^{-7}$) | Porosity % | Pore size (μm) | MOR (psi) | Shrinkage (μm) |
|---|---|---|---|---|---|---|
| Geopolymer 1-1-6 | 800-4 | 70.6 | 16.75 | 5.0 | 2752 2565 2487 | nm |
| 1 | 1000-4 | 28.9 | 30 | 18.7 | 1154 1174 | nm |
| 2 | 500-4 | 19.4 | nm | nm | nm | nm |
| 2 | 1000-4 | 18.5 | 41 | 2.9 | 971 1011 1292 2896 | 0.63 |
| 2 | 1100-4 | 21.9 | 40 | 4.0 | 2908 3512 3616 | 2.283 |
| 2 | 1200-4 | 19.3 | 38 | 5.1 | 3176 6344 4473 | 4.646 |
| 3 | 1000-4 | 18.6 | nm | nm | 1748 1683 1859 | nm |
| 3 | 1100-4 | 19.3 | nm | nm | 5585 5573 5155 | nm |
| 4 | 1200-4 | 15.9 | 41 | 5.0 | 3680 2730 2909 | 1.575 |
| 4 | 1300-4 | 15.7 | 39 | 4.4 | 5903 4769 5410 | 3.858 |
| 5 | 1000-4 | 14.7 | nm | nm | 319 641 480 462 | nm |
| 6 | 1100-4 | nm | nm | nm | nm | nm |
| 11 | 1400-4 | 14.3 | 23 | 5.2 | 4037 4890 | nm |
| 11 | 1300-4 | 13.7 | 46 | 4.6 | 1731 1646 2235 | nm |

Physical properties such as the CTE (upon heating at $800°$ C.) and modulus of rupture (MOR) of pressed, dried and fired composites of the materials of the cordierite and cordierite/silica examples with additions of $B_2O_3$ are given in Table 3 below. The firing temperature and time is shown as ° C.-Hours. These composites contain a geopolymer modified by boric oxide ($B_2O_3$) and are fluid enough on firing at $1000°$ C. to allow good sintering without cracking when used as a skinning cement. $B_2O_3$% is calculated as Wt. % in excess of the total batch, that is cordierite+vitreous silica+Geopolymer (Kasil+Glomax+Ludox). The MOR reading for composition 8 is an average of 5 separate tests.

TABLE 3

Complex Cordierite/Silica Based Composites With $B_2O_3$ Additions: Physical Properties

| Composition base | $B_2O_3$ (Wt. %) | Firing (° C./Hrs) | $CTE_{max}$ ($\times 10^{-7}$) R.T. to 800 C. | MOR (psi) |
|---|---|---|---|---|
| 5 | 1% | 800/4 | 15 | 456 572 425 |
| 5 | 1% | 900/4 | 17 | 825 1060 1024 1237 |
| 5 | 1% | 1000/4 | 17 | 1812 1440 1621 1864 |
| 5 | 1% | 1100/4 | 18 | 1977 1900 1738 |
| 7 | 5% | 700/4 | 13 | 917 1032 1049 |
| 7 | 5% | 1000/4 | 20 | 2447 2551 3220 |

TABLE 3-continued

Complex Cordierite/Silica Based Composites With $B_2O_3$ Additions: Physical Properties

| Composition base | $B_2O_3$ (Wt. %) | Firing (° C./Hrs) | $CTE_{max}$ ($\times 10^{-7}$) R.T. to 800 C. | MOR (psi) |
|---|---|---|---|---|
| | | | | 2255 |
| | | | | 2467 |
| 7 | 4% | 1000/4 | 15 | 1672 |
| | | | | 2656 |
| | | | | 2549 |
| | | | | 2839 |
| 7 | 3% | 800/2 | 13 | 774 |
| | | | | 1521 |
| | | | | 701 |
| | | | | 560 |
| 7 | 3% | 900/4 | 13 | 1900 |
| | | | | 1719 |
| | | | | 2081 |
| 7 | 2% | 900/4 | 16 | 1633 |
| | | | | 1748 |
| 7 | 2% | 1000/4 | 20 | 1350 |
| | | | | 2212 |
| | | | | 2619 |
| 8 | 3% | 1100/4 | 12 | 1308 |
| 9 | 3% | 1100/4 | 10 | 1090 |
| 10 | 3% | 1000/4 | 11 | 920 |

Table 4 shows samples of skinning cements of 90 wt. % solids and 10 wt. % geopolymer, some with additions of $B_2O_3$ to the geopolymer, were that tested for behavior during coating and catalyzation.

TABLE 4

Coating Samples: Physical Properties

| Composition base | $B_2O_3$ (Wt. %) | Firing (° C./Hrs) | CTE ($\times 10^{-7}$) | MOR (psi) |
|---|---|---|---|---|
| 5 | 0% | 1000/4 | 14.7 | 463 |
| 5 | 1% | 900/4 | n/a | 1037 |
| 5 | 1% | 1000/4 | 17.8 | 1702 |
| 5 | 1% | 1100/4 | 18 | 4871 |
| 5 | 3% | 850/4 | 10 | 890 |
| 5 | 5% | 1100/4 | 21 | 2374 |

Table 5 shows a calculation of the composition of a 1-1-12 geopolymer material after it was fired to 1000° C. to eliminate the aqueous species and converted to glass. The calculation assumes no dissolution of the particulate. The resulting glass compositions as a function of $B_2O_3$ added to the original 90-10 cordierite-geopolymer (1-1-12 $K_2O:Al_2O_3$: $SiO_2=KAlSi_6O_{14}$), and the glass percent (assuming no cordierite dissolution) are given in Table 5:

TABLE 5

Calculated Amount of Glass In Fired-Dry Composite Composition #7 as a Function of $B_2O_3$ Additions (in excess wt. % of Particulate + Geopolymer)

| | 1% $B_2O_3$ | 2% $B_2O_3$ | 3% $B_2O_3$ | 5% $B_2O_3$ |
|---|---|---|---|---|
| $SiO_2$ | 62.9 | 52.5 | 45.0 | 35.0 |
| $B_2O_3$ | 19.9 | 33.2 | 42.7 | 55.5 |
| $Al_2O_3$ | 8.9 | 7.4 | 6.3 | 4.9 |
| $K_2O$ | 8.3 | 6.9 | 5.9 | 4.6 |
| Wt % Glass in composite (Calculated) | 5.28 | 6.27 | 7.23 | 9.11 |

Table 6 shows the normalized average of six measurements of the glass composition of composition 7 (above) based on mass balance of oxides in the system assuming no $K_2O$ or $B_2O_3$ can enter the particulate phases. All percentages relate to the total mass of the composite.

TABLE 6

Microprobe Analysis of Glass in Composite Composition #7 with Different Levels of $B_2O_3$ and Resulting Calculation of Particulate Dissolution:

| | 3% $B_2O_3$ | 5% $B_2O_3$ Added | |
|---|---|---|---|
| | 1000 C.-4 Hrs | 1000 C.-4 Hrs | 1100 C.-4 Hrs |
| $SiO_2$ | 70.8 | 62.2 | 70.6 |
| $Al_2O_3$ | 8.9 | 12.2 | 10.5 |
| MgO | 2.5 | 4.3 | 3.7 |
| $K_2O$ | 2.5 | 1.5 | 1.4 |
| $B_2O_3$ | 15.3 | 19.9 | 13.8 |
| Calculated wt. % geopolymer glass | 18.6 | 26.8 | 33.3 |
| Wt. % cordierite dissolved | 3.4 | 8.3 | 8.9 |
| Wt. % vitreous $SiO2$ dissolved | 8.2 | 9.2 | 15.6 |

In accordance with the foregoing detailed descriptions and examples, specific embodiments of the invention particularly include composite materials comprising geopolymer materials with formulas in the range from $(K,Na)_{(1+x)}Al_{(1-x/3)}SiO_4 \cdot mH_2O + pB_2O_3$ to $(K,Na)AlSi_{12}O_{26} \cdot nH_2O$, where m and n are between 0 to 1000, p is between 0 and 40 and x is between −0.2 and 0.2. After water loss on firing, geopolymeric materials comprising, in weight percent: 30-85% $SiO_2$; 1-60% $B_2O_3$; 0-30% $Al_2O_3$; and 0-20% $K_2O+Na_2O$ are provided. And the composite materials hereinabove described include those having average linear coefficients of thermal expansion over the temperature range 25-800° C. not exceeding $18 \times 10^{-7}/°$ C. after firing.

The foregoing description of the specific embodiments reveals the general nature of the invention that others can, by applying knowledge within the skill of the art (including the contents of the references cited herein), readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art.

We claim:

1. A composite article formed of composite material comprising:
   a particulate ceramic filler selected from the group consisting of cordierite, vitreous silica, β-eucryptite, β-spodumene, solid solutions of β-quartz, solid solutions of β-spodumene, and combinations thereof, the particulate filler constituting between 50 and 97% by weight of the material; and
   a geopolymer binder, the geopolymer binder constituting 3 to 50% by weight of the material,
   wherein, after firing to a temperature in the range of 700-1100° C., the composite article has an average linear coefficient of thermal expansion over the temperature range 25-800° C. that does not exceed $30 \times 10^{-7}/°$ C.

2. The composite article of claim 1, wherein said geopolymer binder comprises:
   a boron modified alkali aluminosilicate amorphous phase.

3. The composite article of claim 1, wherein said geopolymer binder is selected from the group consisting of boron-modified aluminosilicates, potassium aluminosilicates and sodium aluminosilicates and combinations thereof.

4. The composite article of claim 1, wherein said article is a structure having an outer skin layer comprising in weight percent:
   at least about 2% geopolymer; and
   less than about 98% particulate ceramic filler.

5. The composite article of claim 1, wherein said article is a flow filter body comprising:
   a ceramic honeycomb structure having a plurality of fluid inlet and fluid outlet channels.

6. The composite article of claim 5, wherein at least some of the fluid inlet and fluid outlet channels include plugs, said plugs being formed of a composite material comprising, in weight percent:
   at least about 2% geopolymer; and
   less than about 98% particulate ceramic filler.

7. A ceramic honeycomb monolith formed of composite material, the composite material comprising:
   a particulate ceramic filler selected from the group consisting of cordierite, vitreous silica, β-eucryptite, β-spodumene, solid solutions of β-quartz, solid solutions of β-spodumene and combinations thereof, the particulate filler constituting between 50 and 97% by weight of the material; and
   a geopolymer binder, the geopolymer binder constituting 3 to 50% by weight of the material;
   the honeycomb monolith being formed by extrusion, drying, and firing to 700-1200° C. and the composite material having an average linear coefficient of thermal expansion after firing not exceeding $30 \times 10^{-7}/°$ C. over the temperature range 25-800° C.

8. A honeycomb monolith according to claim 7 wherein the geopolymer binder is a geopolymer material having a formula of from $(K,Na)_{(1+x)}Al_{(1-x/3)}SiO_4 \cdot mH_2O + pB_2O_3$ to $(K,Na)AlSi_{12}O_{26} \cdot nH_2O$, where m and n are between 0 to 1000, p is between 0 and 40 and x is between −0.2 and 0.2.

9. A honeycomb monolith according to claim 7 wherein the composite material has an average linear coefficient of thermal expansion not exceeding $18 \times 10^{-7}/°$ C. over the temperature range 25-800° C. after firing.

10. A honeycomb monolith according to claim 7 wherein the geopolymer binder is a geopolymeric material comprising, in weight percent after water loss on firing: 30-85% $SiO_2$; 1-60% $B_2O_3$; 3-20% $Al_2O_3$; and 2-20% $K_2O + Na_2O$.

* * * * *